SERVO POSITIONING SYSTEM FOR MAGNETIC DISK FILE

Filed May 22, 1962

2 Sheets-Sheet 1

INVENTOR.
CLARENCE B. STANLEY
BY
Walter J. Madden, Jr.
ATTORNEY

United States Patent Office 3,246,307

Patented Apr. 12, 1966

3,246,307
SERVO POSITIONING SYSTEM FOR MAGNETIC DISK FILE

Clarence B. Stanley, Los Altos, Calif., assignor to International Business Machines Corporation, New York, N.Y., a corporation of New York Filed May 22, 1962, Ser. No. 196,639
6 Claims. (Cl. 340—174.1)

Figure 1:
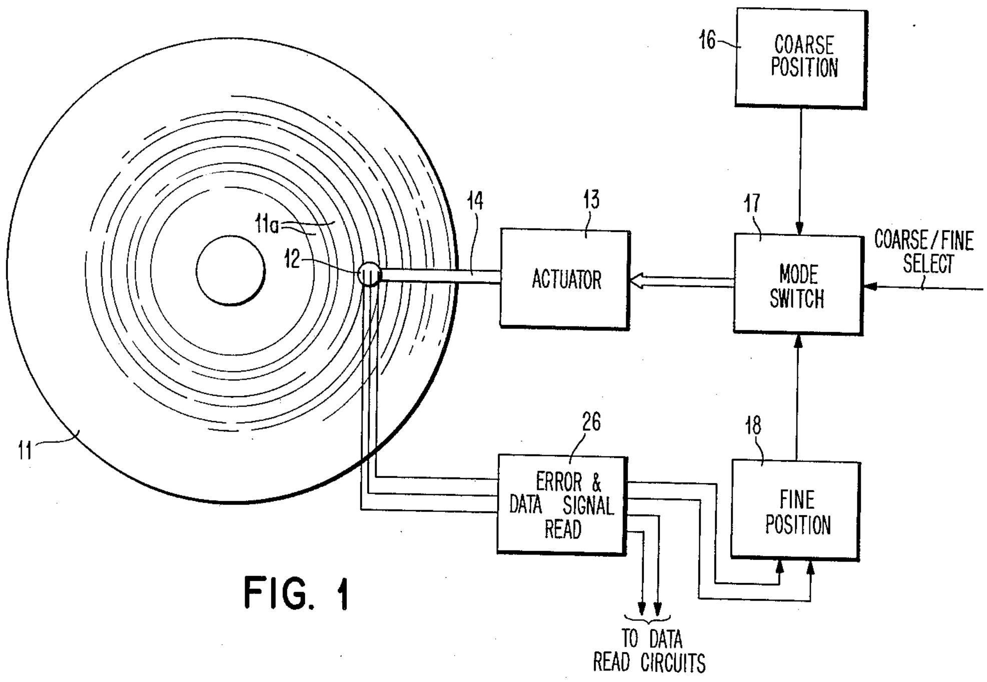

This invention relates in general to servo positioning systems and relates more particularly to such systems for use in connection with a magnetic disk file.

There is extensive usage in the data processing art of data storage devices in the form of one or more spaced magnetic disks mounted for rotation on a spindle. These disks are provided with a magnetizable material on each surface and the data is generally recorded in a plurality of concentric tracks on each such surface. One or more magnetic transducers are movable radially of the disks to selected positions relative to the disk surfaces for either recording data on a selected track or reproducing data therefrom. Utilizing this type of structure, a great amount of data can be stored with relatively quick accessibility to any portion thereof. To increase the economic attractiveness of this type of data storage, a continuing effort is being made to increase the density with which data is recorded in the file, since the greater the amount of data stored on a given unit area of recording surface, the greater the capacity of the system and (generally) the lower the cost of storing a given amount of information.

In increasing the number of bits or binary digits per unit of recording surface area, it is possible either to increase the number of bits of information in a given track, or to increase the number of tracks within a given area. The number of tracks within a given area is dependent to a large extent upon the accuracy with which the magnetic transducer can be positioned with respect to a given track. The positioning of a transducer to select one of several closely spaced tracks must be done very accurately, since virtually no errors in positioning can be tolerated in most types of data processing systems. In one approach to increasing the track density on a magnetic recording disk, the application of A. S. Hoagland and L. D. Seader, Serial No. 776,051, now Patent No. 3,041,111, assigned to the same assignee as the present application, discloses a magnetic storage disk having a plurality of data tracks in combination with a plurality of servo tracks for controlling the position of one or more transducers relative to the data tracks. The servo tracks are sensed by a servo transducer which is mechanically connected to the data transducers. The output from the servo transducer is supplied ot a servo positioning system which moves the entire transducer assembly to the desired track location. The above described apparatus does produce a substantial increase in the number of tracks which may be provided on a given area of disk record surface, since the servo pattern tracks may be closely spaced on the record surface with a consequent close spacing of the data tracks. However, the system does require the provision of tracks on the record disk in addition to the data tracks, thus reducing to some extent the amount of record surface available for data storage.

In accordance with the present invention, I provide a servo positioning system for use with a disk storage device in which the data tracks are utilized in the dual role of data tracks and a source of servo information for controlling the positioning of one or more transducers which magnetically cooperate with the data tracks. This approach eliminates the need for separate servo tracks on a data disk, while still retaining the advantages of a servo positioning system to permit accurate positioning of one or more transducers relative to closely spaced data tracks.

In one embodiment of the invention, the data tracks are produced on the disk surface by a magnetic recording element which is magnetically separate from the reproducing elements. The reading or reproducing portion of the transducer is provided with two separate magnetic elements which are spaced from each other and which separately reproduce the information recorded on the underlying track by the recording element. When the transducer is used to control the servo positioning, the outputs of these two reproducing elements are compared to produce a control signal which is a measure of the displacement of the elements from the center of the selected track. When the transducer is utilized to reproduce data after the servo positioning operation is completed, the output of the transducer is supplied to data read circuits for utilization. Thus, the reproducing transducer first senses the data tracks to control the position of the transducer or transducers relative to these tracks, and upon completion of this positioning operation the transducer senses these same tracks for reproducing the data therefrom. In an alternative embodiment of the present invention, the same transducer elements are utilized to write the magnetic data patterns on the different tracks of the disks and to reproduce these patterns both for servo control information and for data reproduction after the servo positioning operation is completed.

It is therefore an object of the present invention to provide a servo positioning system for controlling the position of one or more transducers relative to a plurality of concentric data tracks on a data storage disk, in which the data tracks themselves are utilized to provide servo control information.

It is a further object of the present invention to provide servo positioning apparatus for controlling the positioning of one or more transducers relative to a plurality of data tracks, in which the transducer includes a pair of spaced magnetic elements which sense a data track to produce outputs which are compared to provide a measure of the position of the transducer relative to the data track.

It is an additional object of the present invention to provide apparatus for positioning one or more transducer assemblies relative to a plurality of data tracks in which a single transducer assembly both records the data tracks and reproduces these recorded data tracks to control the positioning operation and to provide an indication of the recorded data.

The foregoing and other objects, features and advantages of the invention will be apparent from the following more particular description of preferred embodiments of the invention, as illustrated in the accompanying drawings.

Figure 3:
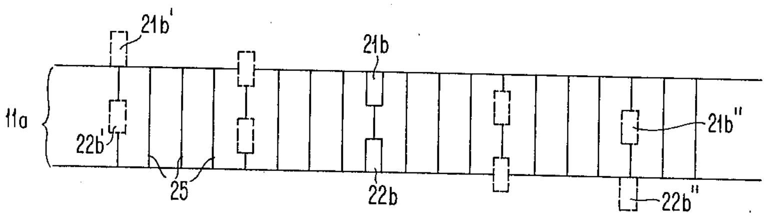
Figure 2:
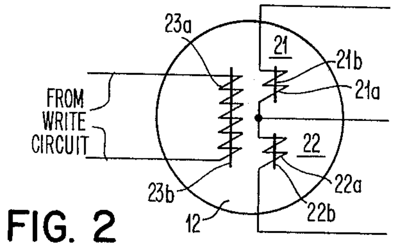
Figure 4:
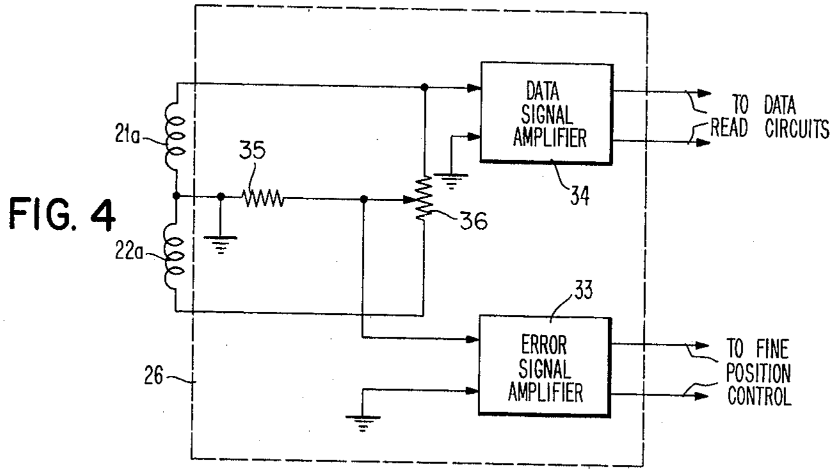
Figure 5:
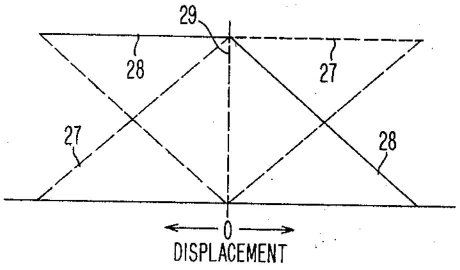
Figure 6:
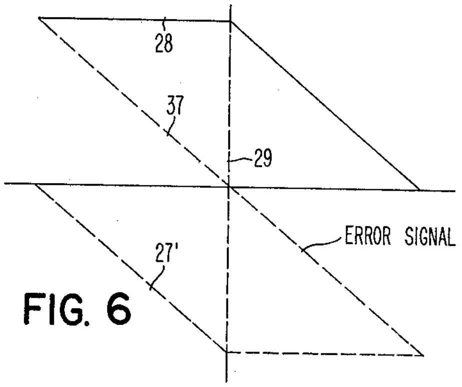
Figure 7:
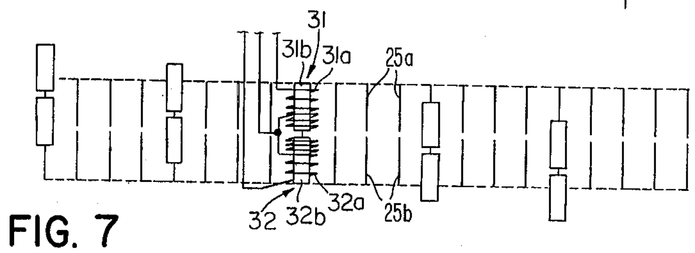
Figure 8:
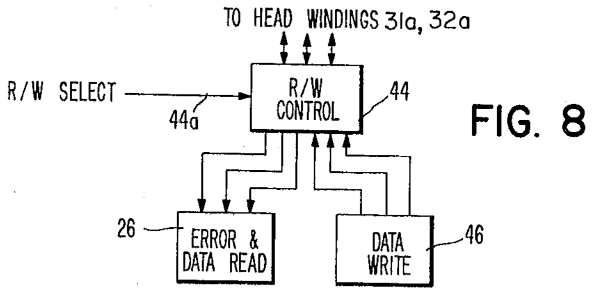

In the drawings:

FIG. 1 schematically illustrates a data storage disk together with circuitry and apparatus for carrying out the present invention;

FIG. 2 illustrates one form of transducer suitable for use in the present invention;

FIG. 3 diagrammatically illustrates the transducer of FIG. 2 in different positions relative to a representative data track;

FIG. 4 illustrates one type of circuit connection for the dual transducer elements for producing a servo positioning control signal and a data reproduction signal;

FIG. 5 graphically illustrates the relationship between the amplitudes of the outputs from the two transducer elements as a function of the transducer position relative to a given data track;

FIG. 6 graphically illustrates the variation of the servo control error signal as a function of the transducer position relative to a given data track;

FIG. 7 illustrates the magnetic pattern produced on a record disk when the same transducer elements are utilized both for recording the data tracks and for reproducing them; and FIG. 8 illustrates circuitry for controlling the flow of recording signals to the transducer and the flow of reproduction signals from the transducer when the same transducer elements are utilized for both recording and reproduction.

Referring to FIG. 1, numeral 11 designates a magnetic disk having a magnetizable coating on at least one surface thereof for the magnetic storage of information. Disk 11 may be the only disk in a single disk file, or may be one of a number of similar disks in a multidisk file. Disk 11 is provided with a plurality of spaced concentric data tracks **11*a* which are recorded by a transducer 12. Transducer 12 is movable to position the transducer adjacent any selected one of data tracks 11*a*. Transducer 12 may be positioned by any suitable means, such as an actuator 13 which is connected to transducer 12 by an arm 14 for moving transducer 12 radially of disk 11** to any one of the discrete data track positions. One type of actuator suitable for this application is described in the copending application of M. E. Freeman, Serial No. 55,994, now Patent No. 3,130,549, assigned to the same assignee as the present application.

In general, actuator 13 moves arm 14 and transducer 12 in response to signals supplied to the actuator for controlling the positioning operation. In one particularly advantageous method of operation, actuator 13 is first controlled in a coarse positioning operation to locate the transducer 12 at approximately the desired track location. Upon completion of this coarse positioning operation, a fine positioning operation is commenced under control of the servo information derived by transducer 12 from the data tracks in accordance with the present invention. In operating in accordance with this technique, a coarse positioning network 16 is utilized to supply a coarse positioning signal to actuator 13 through a network indicated as a mode switch 17. Mode switch 17 receives a controlling signal as indicated to switch from the coarse positioning operation to the fine positioning operation at the required time. A fine position network 18 is provided under control of the servo signals derived in accordance with the present invention to provide a fine positioning signal through mode switch 17 to actuator 13 to complete the positioning of transducer 12 relative to the selected data track **11*a***.

As shown in FIG. 2, the reproducing portion of transducer 12 includes a pair of separate magnetic elements 21, 22. Each of these separate elements includes an electromagnetic coil **21*a*, 22*a*, respectively, and pole and air gap portions 21*b*, 22*b*. In FIG. 2, the widths of the portions 21*b*, 22*b* represent the effective widths of the associated air gaps of these magnetic elements, so that each of these elements is operable to magnetically cooperate with an area on an underlying data track corresponding to the illustrated widths. As best shown in FIG. 3, pole pieces 21*b*, 22*b*, each have a width corresponding to approximately one-third of the total width of a given data track 11*a*, and are spaced from each other in a direction normal to the data track length by an amount corresponding to one-third of the data track width. Coils 21*a* and 22*a* have one common connection, and the three output terminals from these coils are connected to "error and data read" circuitry designated as 26** (FIG. 1).

Transducer 12 may also include a separate magnetic element for recording the magnetic data pattern on the data tracks. Such an element is preferably mounted in the same housing with reproducing elements 21, 22, as is well known in the magnetic recording art. In one embodiment, the writing element includes a coil **23*a* which is wound on a core having an effective air gap width across the record medium corresponding to the portion 23*b*. Write coil 23*a* is energized from suitable write circuitry (not shown) for producing pulses through this coil to produce a corresponding magnetization pattern on the underlying data track. The data produced by energization of write coil 23*a* is in the form of binary bits which are represented in FIG. 3 by the spaced lines 25. Thus, the write element is effective to magnetize areas on the data track having a width corresponding to lines 25, this writing width being approximately three times the width of one of the gaps 21*b*, 22*b*** of the reproducing elements.

FIG. 5 graphically illustrates the relationships between the voltages generated in coils **21*a*, 22*a* as a function of the position of these elements relative to the underlying data track as illustrated in FIG. 3. Curve 27 represents the output signal from coil 21*a*, and curve 28 represents the output from coil 22*a*. When the transducer is displaced from the center of a data track to the position represented by 21*b*′, 22*b*′ of FIG. 3, the voltage generated across coil 21*a* is substantially zero, as shown by dotted curve 27, since it is considerably displaced from the data track, while the voltage generated across coil 22*a* is substantially at a maximum, as shown by solid curve 28, since its pole and air gap portion are entirely over the data track. As the transducer is moved toward the center position from the position shown in the left hand portion of FIG. 3, the voltage across coil 21*a* increases as a larger portion of pole and air gap portions 21*b* are over the data track, while the voltage across coil 22*a*** remains substantially constant at its maximum value.

When the transducer is exactly centered over a data track, as illustrated in the center of FIG. 3, the voltages generated across the coils **21*a*, 22*a* are substantially equal and of similar polarity, as represented by the equal amplitudes of curves 27, 28 at the vertical line 29 in FIG. 5. Similarly, when the transducer is displaced from the center of the data track in the opposite direction, as indicated by the position of 21″, 22*b*″ of FIG. 3, the voltage across coil 21*a* is a maximum, since its pole and air gap portion are over the underlying data track, while the voltage across coil 22*a*** is reduced to substantially zero as its pole and air gap portion are displaced from the data track.

As indicated above, the voltages produced across coils **21*a*, 22*a* are supplied to circuitry for generating a servo control or error signal to control the transducer positioning. This network is indicated schematically at 26 in FIG. 1 and FIG. 4 illustrates one form of such circuitry suitable for utilizing the voltages generated across coils 21*a*, 22*a* for such a purpose. Coils 21*a*, 22*a* are connected in a simple bridge circuit which includes a resistor 35 connected between the common center connection of coils 21*a*, 22*a* and the adjustable tap of a potentiometer 36 having its outer terminals connected to the outer terminals of coils 21*a*, 22*a*. This circuit produces a series opposition connection of the outputs of coils 21*a*, 22*a* to provide an electrical error signal having an amplitude which is proportional to the difference between the amplitudes of the signals from the two coils and having a polarity which corresponds to the polarity of the signal from the transducer with the higher signal amplitude. This error signal appearing between the common connection of coil 21*a*, 22*a* and the adjustable tap of potentiometer 36 is supplied to an error signal amplifier 33. The output from error signal amplifier 33 is supplied to fine position network 18 to control the fine positioning operation, as described above. A data signal amplifier 34** is also provided, and is connected in the manner shown for amplifying the signals generated in the transducer during a data read operation after completion of the fine positioning operation.

The variations of the error signal generated as a function of transducer position are shown graphically in FIG. 6, where curve 27 again represents the output from coil 21*a* and curve 28 represents the output from coil 22*a*, with curve 27 shown in inverted form 27' to represent the series opposition connections of the bridge network of FIG. 4. The resultant error signal output from the bridge circuit of FIG. 4 is represented by curve 37. Curve 37 shows that the error signal has zero amplitude when the transducers are centered exactly over a data track, as represented by the position of vertical line 29, and has an amplitude and polarity determined by the direction and extent of displacement when the transducer is displaced from the track center.

In operation of the embodiment illustrated in FIG. 1, mode switch 17 is first energized to supply the coarse positioning signal from coarse positioning network 16 to actuator 13 to drive arm 14 and transducer 12 to approximately the desired track location. Upon completion of this coarse positioning operation, mode switch 17 is switched to the fine position mode for completion of the positioning operation. In the fine position mode, the voltages generated across coils 21*a*, 22*a* are supplied to the bridge circuit of FIG. 4 to produce an error signal which is a measure of the extent and direction of the displacement of the transducer from the center of the underlying data track as discussed above. This error signal is supplied from amplifier 33 to fine position network 18 to cause actuator 13 to move arm 14 and transducer 12 to the desired location over the center of the data track. When transducer 12 is exactly centered over the data track, the error signal output is zero, as indicated in FIG. 6, so that actuator 13 maintains transducer 12 in this centered position. Upon completion of the fine position operation, the regular data recording or reproducing operation may commence.

In the embodiment of FIG. 1 it was assumed that the recording portion of transducer 12 was magnetically separate from the reproducing elements. If it is desired to utilize the same elements for both recording and reproducing, structure such as that shown in FIG. 7 may be utilized. In such a device, the magnetic elements 31, 32 which were utilized only for reproduction in the embodiment of FIG. 1 are also utilized for recording, as is well known in the magnetic recording art. Thus in FIG. 7, coils 31*a*, 32*a* serve as recording coils which are supplied with signals to produce corresponding magnetic patterns on the underlying data track. In this case, the effective transverse width of the air gap of each element is slightly less than one-half the width of the data track. Thus, coil 31*a* and pole piece 31*b* will produce a magnetization pattern having a width corresponding to the marks 25*a* of FIG. 7, while coil 32*a* and pole piece 32*b* will produce a similar magnetic pattern represented by marks 25*b*. The patterns represented by marks 25*a*, 25*b* together represent the binary bits of the recorded data. It will be understood that coils 31*a*, 32*a* will preferably be energized with identical currents to produce substantially identical magnetic patterns 25*a*, 25*b* which together span the full width of the underlying data track.

For a fine positioning operation utilizing the embodiment of FIG. 7, the signals generated across coils 31*a*, 32*a* are supplied as before to error detection circuits, such as shown in FIG. 4, to develop an error signal which is a measure of the amount and direction of displacement of the transducer from the center of the data track. It will be seen from FIG. 7 that when the transducer is located exactly over the track center, as represented by vertical line 29, the voltages across coils 31*a*, 32*a* are substantially equal in amplitude so that the error signal output from the bridge network will be zero under these conditions. It will also be seen that the amplitude of the error signal will increase as a function of displacement of the transducer from the track center so as to provide an appropriate error signal for controlling the fine position operation in a manner similar to that of the embodiment of FIG. 1.

In connection with the embodiment illustrated in FIG. 7, in which the same magnetic elements are utilized for both recording and reproducing, it is necessary to provide means for controlling the flow of writing current to the coils and the flow of readback signals from these coils to the error and data read circuits. For such control, circuitry such as shown in FIG. 8 may be utilized including a read/write control network 44 which is connected to windings 31*a*, 32*a*. Read/write control 44 receives a read/write select signal from a line 44*a* to enable it for either writing or reading. When writing is to occur, the data write signals from a data network 46 are supplied through circuitry 44 to windings 31*a*, 32*a* to produce the desired magnetic patterns on the data tracks. When the magnetic elements 31, 32 are to be utilized for reading during fine positioning and during data reading operations, the outputs from coils 31*a*, 32*a* are supplied through control circuitry 44 to the error and data read circuit 26 to be utilized in the manner discussed above.

From the foregoing description it will be seen that I have provided a servo positioning system for a magnetic disk file in which the data tracks themselves are utilized to obtain a measure of the transducer position relative to the data track. This novel system is produced by utilizing two separate spaced magnetic elements for reproducing the data tracks both to provide servo information and to subsequently provide data readback. While it might appear that the apparatus disclosed herein requires the use of more track area than if conventional positioning access mechanisms were utilized, a closer examination will indicate that such is not the case. Where conventional precision positioning access devices are utilized, the mechanical tolerances required necessitate the use of a wider track than is required for useful data signal recovery, because of transducer positioning errors. In contrast to this, the apparatus of the present invention permits a substantial reduction in the overall track width requirements because of the precise track registration that can be obtained in a positioning operation.

While the invention has been particularly shown and described with reference to preferred embodiments thereof, it will be understood by those skilled in the art that the foregoing and other changes in the form and details may be made therein without departing from the spirit and scope of the invention. For example, although the invention has been illustrated and described in connection with a record disk having concentric circular tracks, it will be obvious that the invention may also be utilized on a record member having parallel tracks which are not circular, such as the parallel record tracks of a strip or loop member.

What is claimed is:

1. Apparatus for controlling the position of a magnetic transducer relative to a selected one of a plurality of data tracks of binary bits recorded on a magnetic record medium and with which servo control signals are derived from the binary bits in the selected data track, comprising a pair of read elements in said transducer, the effective width of each element being less than one-half the width of a binary bit, said read elements being aligned and separated from each other in a direction normal to the length of said tracks, such that both elements read the same binary bit simultaneously, each of said elements including coil means having a signal generated therein by each binary bit in response to relative movement between said medium and said transducer, means for comparing the signals generated in said coil means to produce an error signal which is a function of the displacement of said transducer from the center of the one track, and positioning means responsive to said error signal for moving said transducer to position it over the center of said track.

2. Apparatus for controlling the position of a magnetic transducer relative to a selected one of a plurality of concentric magnetic record data tracks of binary bits recorded on a record disk and with which servo control signals are derived from the binary bits in the selected data track, comprising actuator means for moving said transducer radially of said disk, a pair of read elements in said transducer, the effective width of each element being less than one-half the width of a binary bit, said read elements being aligned and separated from each other in a direction normal to the length of said tracks, such that both elements read the same binary bit simultaneously, each of said elements including coil means having a signal generated therein by each binary bit in response to relative movement between said disk and said transducer, means for comparing the signals generated in said coil means to produce an error signal which is a function of the displacement of said transducer from the center of the one track, and means responsive to said error signal for controlling said actuator means to position said transducer over the center of said track.

3. Apparatus for controlling the position of a magnetic transducer relative to a selected one of a plurality of parallel data tracks of binary bits recorded on a magnetic record medium and with which servo control signals are derived from the binary bits in the selected data track, comprising a pair of read elements in said transducer, said elements each having an effective width corresponding to approximately one-third of the width of a binary bit and being aligned and separated from each other in a direction normal to the length of said tracks by a distance corresponding to approximately one-third of the bit width such that both elements read the same bit simultaneously, each of said elements including coil means having a signal generated therein by each binary bit in response to relative movement between said medium and said transducer, means for comparing the signal generated in said coil means to produce an error signal which is a function of the displacement of said transducer from the center of the one track, and positioning means responsive to said error signal for moving said transducer to position it over the center of said track.

4. Apparatus for controlling the position of a magnetic transducer relative to a selected one of a plurality of parallel data tracks of binary bits recorded on a magnetic record medium and with which servo control signals are derived from the binary bits in the selected data track, comprising a magnetic recording element in said transducer for recording a magnetic data pattern of binary bits on each of said tracks, a pair of magnetic reading elements in said transducer, said reading elements each having an effective width corresponding to approximately one-third of the width of a binary bit and being aligned and separated from each other in a direction normal to the length of said tracks by a distance corresponding to approximately one-third of said width such that both elements read the same bit simultaneously, each of said reading elements including coil means having a signal generated therein by each binary bit in response to relative movement between said medium and said transducer, means for comparing the signals generated in said reading coil means to produce an error signal which is a function of the displacement of said transducer from the center of the one track, positioning means responsive to said error signal for moving said transducer to position it over the center of said track, and means responsive to completion of said positioning operation for enabling at least one of said reading coil means to read said magnetic data pattern on said track.

5. Apparatus for controlling the position of a magnetic transducer relative to a selected one of a plurality of parallel data tracks of binary bits recorded on a magnetic record medium and with which servo control signals are derived from the binary bits in the selected data track, comprising a magnetic recording element in said transducer for recording a magnetic data pattern of binary bits on each of said tracks, a pair of magnetic reading elements in said transducer, said reading elements each having an effective width corresponding to approximately one-third of the width of a binary bit and being aligned and separated from each other in a direction normal to the length of said tracks by a distance corresponding to approximately one-third of said bit width such that both elements read the same bit simultaneously, each of said reading elements including coil means having a signal generated therein by each binary bit in response to relative movement between said medium and said transducer, means for comparing the amplitudes of the signals generated in said reading coil means to produce an error signal which is a function of the displacement of said transducer from the center of the one track, positioning means responsive to said error signal for moving said transducer to position it over the center of said track, and means responsive to completion of said positioning operation for enabling at least one of said reading coil means to read said magnetic data pattern on said track.

6. Apparatus for controlling the position of a magnetic transducer relative to a selected one of a plurality of parallel data tracks of binary bits recorded on a magnetic record medium and with which servo control signals are derived from the binary bits in the selected data track, comprising a pair of spaced magnetic elements in said transducer for recording a magnetic data pattern of binary bits on each of said tracks and for reading said magnetic pattern, each of said elements having a width corresponding to slightly less than one-half of the width of one of said binary bits, said elements being aligned and separated slightly from each other in a direction normal to the length of said tracks, each of said elements including coil means through which current flows to record said magnetic data pattern and in which a signal is generated by each binary bit in response to relative movement between said medium and said transducer, means for comparing the signals generated in said coil means to produce an error signal which is a function of the displacement of said transducer from the center of the one track, positioning means responsive to said error signal for moving said transducer to position it over the center of said track, and means responsive to completion of said positioning operation for enabling at least one of said coil means to read said magnetic data pattern on said track.

References Cited by the Examiner

UNITED STATES PATENTS

| | | | |
|---|---|---|---|
| 2,679,620 | 5/1954 | Berry | 318—31 |
| 2,736,776 | 2/1956 | Camras | 179—100.2 |
| 2,811,709 | 10/1957 | Haselton et al. | 340—174.1 |
| 2,871,432 | 1/1959 | Marzetta | 318—31 |
| 2,931,864 | 4/1960 | Moehring et al. | 179—100.2 |
| 3,007,144 | 10/1961 | Hagopian | 340—174.1 |
| 3,023,404 | 2/1962 | Dickerson | 340—174.1 |
| 3,034,111 | 5/1962 | Hoagland et al. | 340—174.1 |

BERNARD KONICK, *Primary Examiner.*

IRVING L. SRAGOW, *Examiner.*

F. C. WEISS, A. I. NEUSTADT, *Assistant Examiners.*